Figure 1:
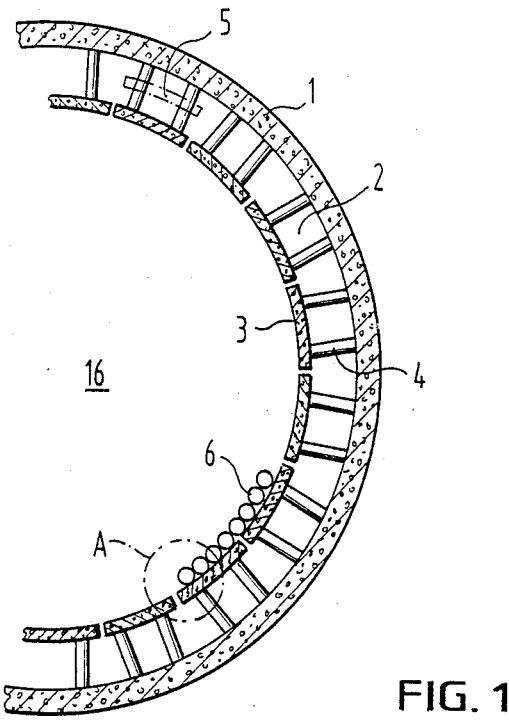

United States Patent [19]
Rohringer

[11] Patent Number: 4,811,535
[45] Date of Patent: Mar. 14, 1989

[54] DOUBLE-WALLED SPECIAL REFUSE DUMP RECEPTACLE

[76] Inventor: Ernst Rohringer, Steuler Industriewerke GmbH, Hermann-Geisen-Str. 177, D-5410 Hoehr-Grenzhausen, Fed. Rep. of Germany

[21] Appl. No.: 34,834

[22] Filed: Apr. 6, 1987

[30] Foreign Application Priority Data

Apr. 7, 1986 [DE] Fed. Rep. of Germany ....... 3611654

[51] Int. Cl.⁴ .......................... E04B 2/28; E04H 7/26
[52] U.S. Cl. ........................................ 52/249; 52/508; 52/513
[58] Field of Search ................ 52/245, 249, 506, 508, 52/513, 383, 479, 481; 110/336, 338, 339, 340; 62/45, 47; 220/901

[56] References Cited

U.S. PATENT DOCUMENTS

| | | | |
|---|---|---|---|
| 1,552,394 | 9/1925 | Cowing | 52/573 |
| 2,012,070 | 8/1935 | Hohl | 52/479 |
| 2,536,039 | 1/1951 | Craven | 52/513 |
| 2,889,698 | 6/1959 | Stevens | 52/513 |
| 2,910,151 | 10/1959 | Millstine | 52/508 |
| 3,163,265 | 12/1964 | Waite | 52/573 |
| 3,205,631 | 9/1965 | Harris | 52/479 |
| 3,319,431 | 5/1967 | Clarke et al. | 220/901 |
| 3,408,784 | 11/1968 | Crowley | 52/249 |
| 3,688,938 | 9/1972 | Yamamoto et al. | 62/45 |
| 4,038,799 | 8/1977 | Shanks | 52/481 |
| 4,408,420 | 10/1983 | Haase | 52/249 |

FOREIGN PATENT DOCUMENTS

303027 8/1968 Sweden .................................. 52/508

OTHER PUBLICATIONS

Mull & Abfall; Jun. 1985; pp. 199-203.

*Primary Examiner*—Michael Safavi
*Attorney, Agent, or Firm*—Kenyon & Kenyon

[57] ABSTRACT

A dump receptacle has an outer wall and an inner wall, the inner wall consisting of several, adjacent wall elements which are supported on the outer wall. When repairing the inner lining of the dump receptacle, individual wall elements can be removed through the space between the inner wall and the outer wall. This dump receptacle permits the repair of the lining even if the receptacle is full and is thus especially suitable for the long-term storage of special refuse.

9 Claims, 1 Drawing Sheet

U.S. Patent    Mar. 14, 1989    4,811,535

DOUBLE-WALLED SPECIAL REFUSE DUMP RECEPTACLE

It is a prerequisite for maximum safety dumps that the inner lining of the receptacles, made for instance of concrete, be controllable and repairable.

The purpose of maximum safety dumps is the long-term storage of extremely dangerous waste products which are usually very aggressive. Thus, the inner surface of the concrete must be protected by a liquid-proof and gas-tight lining. Said lining prevents the corrosion and static weakening of the concrete and thus prevents the dangerous contents from issuing out of the receptacle and avoids a contamination of the concrete body which would thereby become special refuse itself when breaking down the dump.

In maximum special refuse dumps, a storage period of several decades must be expected for the contents. During this period the lining is exposed to conditions which can be defined only insufficiently in advance. Furthermore, chemical reactions of the filling cannot be ruled out, which could result in new, unknown effects on the lining.

Under these circumstances it would appear necessary that the lining be repairable. Up to now no construction has been found which permits the repair of the lining when the dump receptacle is full. Thus the receptacle would have to be partially or completely emptied when making repairs. Since such dumps are planned in very large dimensions of a diameter of up to 30 meters and more, it is out of the question that the dangerous contents be placed into another receptacle on the grounds of safety and economy. This would entail placing a second receptacle of the same size and same quality in the direct vicinity, which means doubling the investment sum. The process of placing the dangerous, possibly degassing contents, which were compressed by the storage, into another receptacle would involve a great deal of expenditure. On the other hand, a mining advance to the place to be repaired is out of the question in special refuse dumps of this kind for safety reasons.

The journal "Müll und Abfall" (refuse and waste), 6/1985, pages 199-203, discloses a receptacle for special refuse dumps having an outer wall and an inner wall at a distance from the outer wall. The inner wall has wall elements (plates) which are supported against the outer wall. In contrast to this, the present invention is based on the object of providing a dump receptacle which permits the repair of the inner wall of the receptacle when the receptacle is full and without having to remove the contents of the dump from the damaged area of the inner wall. This object is achieved by the features of the present invention. In order to achieve said object, the invention is based on the general concept of forming a double-walled receptacle having an inner wall made of wall elements which can be removed individually if necessary. The space between the outer wall and the inner wall which is formed by the wall elements serves for removing and exchanging or repairing the wall elements so that the individual wall elements and the place to be repaired are accessible.

The receptacle of the present invention allows access to the inner lining and to repair it when the dump is full. Furthermore it also becomes possible to subsequently provide a complete new lining.

In the following the invention is explained in detail referring to the drawings.

Figure 2:
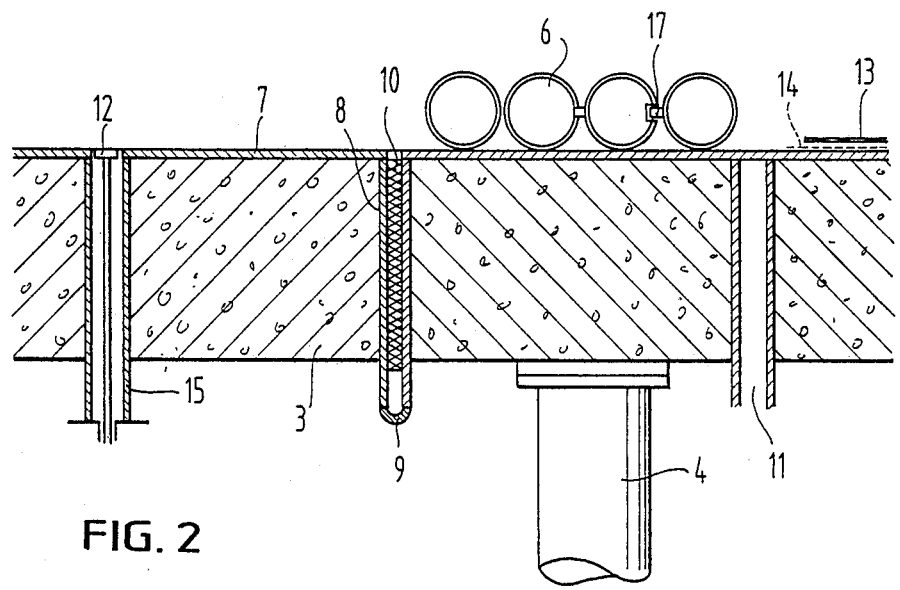

FIG. 1 shows a horizontal cross-section through a cylindrical dump receptacle according to the invention, and FIG. 2 shows an enlarged cross-section of the detail A in FIG. 1.

The receptacle consists of an outer case 1 produced in a known way and made for instance of concrete. The outer case 1 is the static carrier for supporting the inner receptacle 3 which, according to the invention, consists of individual elements. This inner receptacle is provided with a lining 7 and serves for safely and tightly incasing the dump contents 16 and for sealing the same against the space 2 which serves as a control/working room. Inner receptacle 3 includes large-sized plate elements, made for instance of concrete, which form the inner wall of the receptacle and are separated from the outer wall 1 by means of supports 4 which are mobile and permit individual elements to be moved back into the control/working room 2, as shown in situation 5 in FIG. 1. In the control/working room 2 the lining 7 can now be repaired or replaced.

While the individual inner wall elements are moved back as described above, the problem of preventing the filling contents from slipping or breaking into the opening formed in the inner wall now arises. According to the invention, this is done by bridging the opening using supporting profiles and/or icing the dump contents in the area of the opening.

According to the detailed presentation in FIG. 2, pipes 6 can be provided therefor and are placed in front of the lining 7. Instead of pipes, other attachment elements can be used as well, for instance other profiles or wall elements as far as they can also take on the tasks assigned to the pipes. The compression proof pipes 6 preferably consist of checmically stable material, e.g. special steel or plastics. If necessary, the plastic pipes can be reinforced by steel pipes in order to increase their stability against the dump filling pressure acting from outside, or they can be filled with water. The pipes go from the bottom of the dump up to the upper accessible dump border. Before a wall element is moved back, the dump contents lying next to it can be iced by introducing a coolant into the pipes of this area. It is also possible to determine the altitude area of the icing by plugs introduced into the pipes. According to the degree of moisture of the dump contents, it might be necessary to inject water for the formation of a bridge-forming ice armour. This can be done from the top of the dump via borings placed in the dump contents or by supporting pipes 15 placed in the wall elements and closely connected with the lining.

Should it become apparent that the pipes 6 are affected by the dump contents, these can be individually removed out of the top of the dump after the surrounding have been iced.

After the dump contents have been iced in the area of the wall element to be repaired, the pipes are reinforced by introducing supporting profiles so that they are in a position to support the dump contents. The contact surfaces of the pipes 6 can be provided with a tongue-and-groove joint 17 in order to produce some kind of barrier for the filling during normal operation.

At the same time, the pipes or other profiles 6 placed before the segment wall protect the lining 7 from mechanical damage by the filling.

For additional protection, a film or foil 13 can be placed in a known manner in front of the lining 7 which is rigidly or detachably connected with the wall element 3. It is also possible to provide a drainage gap 14 between the film or foil 13 and the lining 7. According to the invention, this drainage gap, in which a so-called drainage mat or drainage layer is preferably found, permits pressing in water for rinsing and thus cleaning the drainage gap in the area to be repaired. The water can be pressed in through a connection pipe 15 from the control area 2. Thus, when the wall elements are moved back, a cleaned portion of the film/foil surface 13 forms an area of vision onto the dump contents.

According to the invention it is possible to constantly check the condition of the lining materials 7 and 13 but also of the pipes 6 while the receptacle is full. The connection piece 15 advantageously serves this purpose, because material samples 12 can be exposed to the conditions of the dump contents thereby. By testing these material samples it can be recognized in due time whether or when the lining materials must be repaired or replaced.

According to the invention the lining of the individual, repaired wall elements 3 can be connected with the lining of the adjacent wall elements which are separated by joints after they have been moved back into the normal position. According to the invention, the lining 7 passes along the side surface 8 of the wall elements 3 into the control/working room 2 for this purpose. The tight connection of the linings of the adjacent wall elements is then performed from the backward side of the dump wall, i.e. from the working room 2. The connection 9 is performed according to the techniques corresponding to the material, for example by welding in the case of special steel lining or thermoplastic lining. The connection 9 can take into account minor differential elongations between the wall elements 3. If necessary, the joint between the wall elements can be additionally sealed against the issue of dump contents by means of a sealing 10.

In order to permit an easy and quick replacement of the lining 7, it is preferably applied to the surface of the wall elements as a loose shroud or can be punctually connected thereto. In the case of a leakage, the gas or liquid will spread between the lining 7 and the respective wall element 3. In order to ensure an easy decontamination of the material of the wall element when replacing the lining shroud 7, the surface of the wall element must be protected by an appropriate sealing. It is a further advantage of the described construction that possible leakages are restricted to one wall element only.

In order to determine leakages, tubes 11 may be provided, which are not connected with the lining 7. If a leakeage occurs, a leakage indicator which is connected with the tube 11 immediately indicates that the lining has been penetrated. In order to prevent a premature leakage, the outer wall of the tube 11 and the lining 8 which passes along the joint must be sealed against the attached material of the wall element in an appropriate way.

Although the above description of the Figures refers to the cylindrical case of a dump receptacle, the same applies for forming the ground surface and also for receptacles having a different form, e.g. having straight receptacle surface.

I claim:

1. A receptacle, in particular, for special refuse dumps, which comprises:
   an outer wall;
   an inner wall at a distance from the outer wall and comprising several adjacent wall elements, with a joint between the adjacent wall elements;
   a space between the outer wall and the inner wall; the adjacent wall elements being provided with-.
   a tight, chemically stable lining comprising lining sections, each lining section extending outwardly through the joint between adjacent wall elements into said space;
   supports for supporting said adjacent wall elements on the outer wall; and
   a separable wall of supporting elements placed in front of said lining, said supporting elements comprising a plurality of pipes;
   wherein the adjacent wall elements can be moved into the space between the outer wall and the inner wall.

2. A receptacle according to claim 1 wherein the adjacent wall elements are detachaby connected to the supports.

3. A receptacle according to claim 1 including sealing means in said joint.

4. A receptacle according to claim 1 wherein the lining sections have free ends and the free ends of the lining sections of the adjacent wall elements can be sealingly connected in said space.

5. A receptacle according to claim 1 wherein said pipes are steel.

6. A receptacle according to claim 1 wherein said pipes are plastic.

7. A receptacle according to claim 1 wherein said pipes are water-filled.

8. A receptacle according to claim 1 including a second lining in front of the chemically stable lining, with a drainage gap between the second lining and the chemically stable lining.

9. A receptacle according to claim 1 wherein said inner wall includes leakage detection tubes.

* * * * *